(12) United States Patent
Chesner et al.

(10) Patent No.: US 6,637,135 B2
(45) Date of Patent: Oct. 28, 2003

(54) CONTAMINATED SEDIMENT REMOVAL VESSEL

(76) Inventors: Warren Howard Chesner, c/o Chesner Engineering, P.C. 2171 Jericho Turnpike, Commack, NY (US) 11725; James Melrose, 600 Robinson Rd., Greenport, NY (US) 11944

( * ) Notice: Subject to any disclaimer, the term of this patent is extended or adjusted under 35 U.S.C. 154(b) by 0 days.

(21) Appl. No.: 10/094,064

(22) Filed: Mar. 8, 2002

(65) Prior Publication Data

US 2002/0124440 A1 Sep. 12, 2002

Related U.S. Application Data

(63) Continuation of application No. PCT/US01/09025, filed on Mar. 20, 2001.
(60) Provisional application No. 60/274,898, filed on Mar. 9, 2001.

(51) Int. Cl.$^7$ ................ E02F 7/00; E02D 5/02
(52) U.S. Cl. ................ 37/318; 37/345; 405/63; 405/274; 405/278
(58) Field of Search ............ 37/313, 312, 318, 37/320, 345; 405/63, 64, 70, 71, 203, 204, 274, 276, 277, 278, 279; 210/257.2, 242.1; 114/258, 72, 74 R, 74 A

(56) References Cited

U.S. PATENT DOCUMENTS

| | | | | |
|---|---|---|---|---|
| 507,926 A | * | 10/1893 | Peck | 405/13 |
| 2,105,014 A | * | 1/1938 | Segel | 405/11 |
| 4,033,137 A | * | 7/1977 | Geist | 405/71 |
| 4,042,279 A | * | 8/1977 | Asakawa | 299/8 |
| 4,110,990 A | * | 9/1978 | Thompson et al. | 405/14 |
| 4,270,874 A | * | 6/1981 | March et al. | 405/63 |
| 4,386,872 A | * | 6/1983 | Smith | 405/13 |
| 4,419,030 A | * | 12/1983 | Burkemper | 405/278 |
| 4,519,729 A | * | 5/1985 | Clarke et al. | 405/129.6 |
| 5,277,517 A | * | 1/1994 | McClellan | 405/13 |
| 6,089,789 A | * | 7/2000 | Santamaria | 405/63 |
| 6,293,731 B1 | * | 9/2001 | Studer | 405/129.2 |
| 6,432,303 B1 | * | 8/2002 | Chesner et al. | 210/170 |

FOREIGN PATENT DOCUMENTS

| | | | |
|---|---|---|---|
| JP | 57-24716 | * | 2/1982 |
| JP | 57-66242 | * | 4/1982 |
| JP | 61-274005 | * | 12/1986 |

* cited by examiner

Primary Examiner—Robert E. Pezzuto
Assistant Examiner—Thomas A. Beach
(74) Attorney, Agent, or Firm—Alfred M. Walker

(57) ABSTRACT

A method is described for removing sediments during dredging operations to minimize the release of contaminants at marine locations containing sediments that are deemed contaminated and require removal. The preferred method comprises the use of a specially designed marine vessel that establishes a negative differential pressure gradient between a dredge control zone and the external ambient water environment, thereby preventing the release of contaminants dispersed during the dredge process into the ambient water environment. The preferred method also includes the use of marine vessels to remove contaminants contained within said control zone and to provide for the management of solids collected in the process.

43 Claims, 11 Drawing Sheets

SECTION A-A FROM FIG. 5

SECTION B-B FROM FIG. 5

DETAIL 1

DETAIL 2

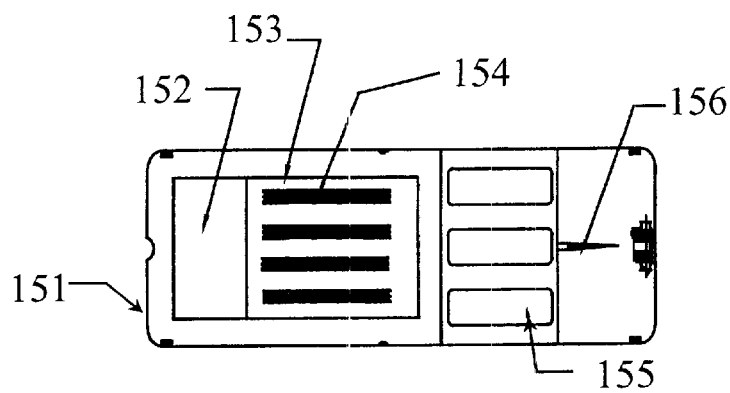
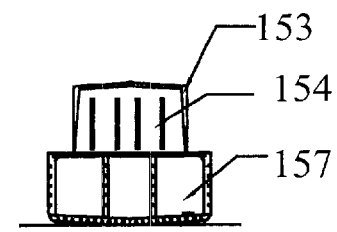
FIG. 13
FIG. 16
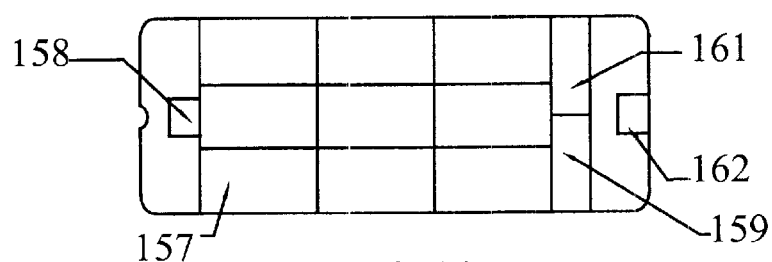
FIG. 14
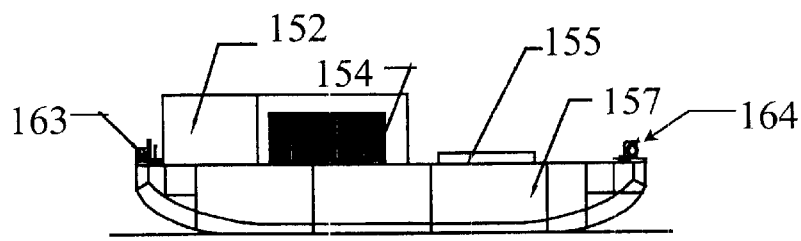
FIG. 15

CONTAMINATED SEDIMENT REMOVAL VESSEL

This application is based upon provisional patent application No. 60/274,898, filed Mar. 9, 2001, entitled "Secure Dredging System for Contaminated Sediment Clean-up," and this application is a continuation of PCT/US01/09025, filed Mar. 20, 2001.

TECHNICAL FIELD OF THE INVENTION

This application relates to a process for removing contaminated sediments from the bottom of lakes, reservoirs, rivers, streams, and other water bodies, while at the same time preventing the release of particulate matter or soluble contaminants to the ambient water environment during the dredging excavation process.

BACKGROUND OF THE INVENTION

Removal of sediments that accumulate on the bottom of natural and artificial water bodies is commonly practiced to permit navigation of ships and/or to maintain designated water depths. This type of sediment removal is commonly referred to as maintenance or navigational dredging. Sediments are sometimes removed to clean up the bottom of these water bodies when such sediments are found to be contaminated and pose a threat to public health and/or the ecosystem. This type of sediment removal is commonly referred to as environmental dredging. In some cases the objectives of the sediment removal activity are both maintenance and environmental.

Current methods of maintenance or environmental dredging can be divided into two general categories. They include mechanical dredging and hydraulic or vacuum dredging. The fundamental difference between these categories is the equipment used and ultimately the form in which the sediments are removed. Mechanical dredges typically remove the sediments directly with clamshell-type buckets at a relatively low liquid to solid ratio (i.e., relatively little water is entrained in the sediments compared to hydraulic dredging operations). Hydraulic or vacuum type dredges agitate the bottom channel to dislodge the sediment, and pump (vacuum) the sediment from the waterway. In hydraulic dredging operations the sediment is transported in a slurry with water acting as the transportation medium. This results in a water sediment mix with a high liquid to solid ratio. The sediment in the slurry must later be segregated from the water carrier. This is typically accomplished using large impoundment areas where the sediment is extracted by settling and the water (effluent) is returned to the originating waterway.

The removal of bottom sediments, whether by a mechanical or by a hydraulic dredging operation, will involve some form of raking, grabbing, penetrating, cutting, or hydraulically scouring the bottom of the waterway or channel. During such operations, sediments will readily be dispersed. In addition to sediment loss due to resuspension, in the case of mechanical dredging operations, sediment loss will occur when the bucket leaks sediments, and particularly when the bucket is raised above the water during the excavation process. This leakage occurs due to improper bucket closure resulting from debris stuck in the bucket, inadequate bucket sealing mechanisms, and the displacement of water contained within the bucket that occurs when solids enter the bucket during the excavation. While hydraulic dredging operations may have the advantage of a vacuum system that can assist in capturing some resuspended solids during bottom scouring operations, the large volumes of water that must be withdrawn and processed during such operations limit the feasibility of hydraulic dredging operations to areas where large impoundments are available. In addition, the presence of tides and currents can be expected to significantly reduce the efficiency of capture of resuspended solids by vacuum dredges when compared to operations that occur in quiescent waters.

Sediment resuspension and loss during dredging is a particular concern in environmental dredging operations where sediments are contaminated and the resuspension and dispersion of such sediments can result in ecological and human health impacts. This concern is underscored by the fact that most contaminants are generally associated with or bound to the fine particles, which are also those particles that are most easily resuspended and dispersed during the dredging operation. In addition to particulate resuspension, the potential release of soluble contaminants that may be present in the pore space of contaminated muds or may be subject to dissolution from the mud particle upon resuspension during dredging operations is also a concern.

Other problems associated with environmental dredging operations include the lack of suitable methods to monitor the actual loss of sediment that occurs during the excavation process, the lack of appropriate methods to monitor and ensure that the cleanup is being properly effected, and the absence of suitable methods to make certain that the handling of such sediments, during marine-to-land transfer and land-based transfer of such materials, do not result in liquid leakage or loss of sediments.

Current approaches for monitoring sediment loss during the excavation typically involve the use of discrete upgradient and downgradient subsurface sampling stations. Water samples collected at these stations are used to assess the increase in solids or turbidity loading to the waterway during the excavation. Given the unpredictability of subsurface currents, the discontinuous dredging operation, and discrete (spike) loadings that can be expected during dredging operations, the collection of representative samples is difficult. In addition, a determination of sediment loss can only be made after the release has already occurred.

To achieve target cleanup goals at a contaminated sediment site, due to the resuspension and the redeposition of sediment that occurs during conventional mechanical and hydraulic dredging operations, second and third passes to clean the contaminated area are routinely common. Even with multiple passes of a contaminated area, targeted specifications are still difficult to achieve. Current methods to assess the effectiveness of the cleanup of the subsurface sediments after the excavation typically involve the collection of core samples at discrete locations in the dredge area. Due to the expected variability in the spatial distribution of contamination in bottom sediments, particularly after the sediment is disturbed in a dredging operation, the collection of representative bottom sediment samples is also a difficult proposition. If the remediation effort has not met the required specifications, dredging equipment must be remobilized and returned to the location for additional cleanup at significant expense.

The removal and management of contaminated sediments during environmental dredging operations is best accomplished by collecting the sediments in a secure manner, dewatering the sediments, and transferring the sediments in such a way that there will be little risk for spills or loss of material. In mechanical dredging operations, sediments are typically placed in solids barges that require off-loading facilities that make use of additional cranes and buckets to remove the sediments from the solids barge for land-based management. Such operations are extremely messy and difficult to manage, and present a relatively high risk for further environmental contamination. Hydraulic dredging operations, as previously noted, require the construction of facilities for collecting the slurry and segregating the solids from said slurry, and thickening and/or dewatering the solids prior to transport to the disposal site. These facilities must be constructed in close proximity to the dredging operation and also increase the risk of local environmental contamination.

Most of the advances in environmental dredging technology in recent years have focused on the development of improvements in the design of buckets or vacuum dredges that tend to reduce or control the disturbance of the bottom of the waterway during the sediment excavation process (Ouwerkerk, R. and H. Greve (1994). "Developments in Dredges During the Last Decade." Pages 690–699 in Dredging '94, Proceedings of the Second International Conference on Dredging and Dredged Material Placement, Edited by: E. C. McNair, Jr., American Society of Civil Engineers. 1994; Zappi, P. A. and D. F. Hayes. "Innovative Technologies for Dredging Contaminated Sediments." Improvement of Operations and Maintenance Techniques Research Program, U.S. Army Corps of Engineers, Waterways Experiment Station, Vicksburg, Miss. Miscellaneous Paper EL-91-20. Sep. 1991; and Herbich, J. B. Handbook of Dredging Engineering, McGraw Hill, Inc., New York. 1992).

The primary objective of most mechanical bucket modifications has been to create as tight a seal as possible on the bucket through the installation of rubber backing compressible seals and sensors (proximity switches) to ensure the bucket is closed prior to lifting in the hope of minimizing spillage. A dredging apparatus referred to as a "cable arm clamshell bucket," advertised by Cable Arm Incorporated of Trenton, Mich., claims to reduce turbidity levels through its use of electronic sensors to detect bucket closure and compressible seals. While these types of systems offer improved designs, they do not eliminate the impact due to raking, upswell, and water displacement that will occur on excavation. In addition, such systems are incapable of effectively addressing leakage that will occur when debris is caught in the bucket and prevents full bucket closure.

Numerous modifications and subcategories of hydraulic dredges have been developed to attempt to mitigate problems associated with hydraulic dredging particle resuspension (Cleland, J. Advances in Dredging Contaminated Sediment, Scenic Hudson, Inc., 1997). Many have specific features that are designed to reduce sediment dispersion resulting from cutterblade, jetting, or raking mechanisms. None of these methods, however, have proven to be highly effective in areas where currents are present, nor do they significantly reduce or have suitable provisions for managing large volumes of contaminated water that are generated in the process. Large impoundment areas and suitable treatment methods are still needed to contain fine contaminated particulates that are drawn up with these sediments.

In addition to the use of improved mechanical or vacuum dredge systems, physical barriers such as silt curtains (flexible, impermeable canvas or rubber-like sheets that are deployed by attaching ballast to the bottom of the fabric and floats to the top to hold the curtain in a vertical configuration) or sheet piles have been employed during environmental dredging operations in attempts to isolate the area of dredging and contain contaminated particulates that are dispersed into the water column during the excavation process. They do not prevent the migration of soluble contaminants. While these barriers provide some particulate containment, silt curtains lack secure containment due to the porous nature of joints and curtain underflow, and their use in waterways with currents or tides is, in most cases, impractical. The application of fixed sheeting along the periphery of a dredge area is costly and, due to the porous joints of sheet piles, cannot guarantee complete particulate containment. Finally, while the referenced physical barriers provide some containment, once the barriers are removed the resuspended particles that were temporarily contained are free to migrate from the dredge area.

Although some advancement has been made in bucket or vacuum dredging, little progress has been made in developing physical barriers that effectively contain resuspended particulates or soluble contaminants during a dredging operation.

Smith, in his U.S. patent, Dredge Environ Protection Assembly, U.S. Pat. No. 4,386,872, Jun. 7, 1983, does describe an approach for temporarily isolating an area within a waterway during a dredging operation to prevent disturbed sediment from spreading. Smith proposes the use of a barge-mounted assembly where the barge (an open hopper barge) system is floated over the area to be dredged and a series of separate large side panel members (preferably ⅜ inch thick steel, 24 feet long, and 18 feet high) are lowered from the barge to the river channel to isolate the dredge area. Smith's invention requires that the area within the panels be pumped dry prior to the excavation. Smith further describes the use of panel support columns that would be lowered to a depth below the bottom necessary to resist the water pressure that would be exerted on separate side panel members. Smith's invention provides for the use of a series of support column caissons (preferably 4 feet in diameter) that would be lowered to the bottom to support the entire vessel when the inner panel area is dewatered. Smith describes these caissons as "stilts" to support the barge above the channel. Smith makes no mention as to how these caissons would support the barge on a soft muddy foundation, but does state that the columns would be lowered to a depth below the bottom surface of the waterway that would be required to support the barge. Smith describes in his patent how the panels would be lowered and set up end to end until they reach the bottom with fluid-tight seals located between the side panels and the panel support columns. Smith describes these fluid tight seals as "rubber sealing strips" to prevent infiltration of water through the panels into the dredge area.

Although Smith in his invention proposes equipment to physically separate the dredge area from the ambient water environment, Smith's invention lacks practical utility. His plan to pump the area dry would exert significant hydrostatic pressure on his proposed sliding panel wall and its support structure. Smith fails to recognize that continuous pumping will almost certainly be required to maintain his dredge zone in the dry condition that his invention requires, and he does not address the disposition of the water that would be pumped from his dredge zone, which can be expected to contain contaminants.

Smith's invention requires caissons to support the entire weight of the barge. This would necessitate that his support caissons be driven to a firm foundation such as bedrock. Such a foundation could be well below the bottom of the channel, further complicating the practicality of the invention. Smith does not describe any means to drive the panels below the initial placement depth in the event it becomes necessary to excavate deeper to remove additional contaminated sediment during a dredging operation. His proposed use of rubber sealing strips sandwiched between his panel support columns and panels, to prevent water infiltration, is theoretically plausible, but Smith fails to address how these strips would be attached nor how they would be sufficiently secure to withstand the abrasive forces they would encounter during deployment and redeployment of the side panels (if his system is to be mobile as implied). Smith does not address how the joints between multiple panels that lay one upon another, if needed, would be sealed.

Smith implies in his patent that an inclined non-horizontal bottom channel, which would result in a gap between the bottom panel and the inclined bottom surface, could be mitigated by attaching one or more extension panels to the bottom panel to block the flow of water. Smith states that such lower extension panels could be attached to the upper panels with bolts. Smith fails to address how these gaps would be identified, how the extension panels would be sized, and how bolts would be attached. One can only assume that Smith is considering the use of divers to bolt extension panels to all locations where gaps in the bottom seal are identified. Even so, Smith fails to address how these lower extension panels would be made watertight. Smith's invention fails to account for debris such as logs, rocks, etc. that will invariably be encountered at the bottom of the channel at most dredge locations, preventing a side panel from fully penetrating the subsurface, thereby resulting in additional gaps under the panel. Large gaps would result in an inability to pump the inner dredge area dry, which is a key feature of Smith's invention. In summary, the authors believe that Smith's invention lacks the means to make it a practical mobile vessel for removing contaminated sediments in a dredging application.

Other inventors have focused their efforts on the development of physical barriers in the marine environment to contain spills or to provide dry areas for construction.

Santamaria, in his U.S. patent, Barrier for Water Treatment, U.S. Pat. No. 6,089,789, Jul. 18, 2000, describes a curtain barrier system that can be deployed to isolate two bodies of water for the purpose of treating the water contained on one side of the barrier without mixing of the two water bodies. Santamaria's invention includes two flexible water impermeable curtains, similar to conventional silt curtains, that are deployed vertically, joined to a bottom web that contains ballast material to hold the barrier to the lagoon bottom and end anchors (on shore) to prevent the movement of the barrier.

While Santamaria describes in his invention a system to isolate two water bodies, Santamaria does not relate his system to a contaminated sediment dredging operation. His invention is intended to provide for the treatment of water on one side of an area of a lagoon that is separated from the remaining lagoon locations. Santamaria's invention is similar to commercially available silt curtains that are held in place by a ballasted bottom and a buoyed float at the top. Santamaria describes features of his impermeable flexible curtain that differentiate it from silt curtains used in commercial applications. While Santamaria's invention does provide some measure of separation, it cannot be used in the center of a channel where it cannot be anchored, nor would it be effective in sealing in a location where there are currents, and as such its application is primarily intended for a quiescent lagoon.

Strange, in his U.S. patent, Marine Pollution Containment Device, U.S. Pat. No. 4,889,447, Dec. 26, 1989, describes a containment barge consisting of two self-propelled semi-circular hulls that can be oriented in a manner that contains marine spills. The device described by Strange is designed as a rapid deployment device and provides for the mobile containment of oil spills at the surface. It does not extend vertically to the bottom of a channel, which would be necessary to address contaminated sediment dredging containment issues.

McClellan, in his U.S. patent, Mobile Cofferdam, U.S. Pat. No. 5,277,517, Jan. 11, 1994, describes a mobile cofferdam vessel that consists of a watertight rectangular shell that can be filled with water to submerge the cofferdam vessel in place, or have the water evacuated to float the vessel. The submerged vessel is designed to replace conventional stationary cofferdams that establish a zone that could be dewatered for use in constructing on the bottom of a waterway. McClellan describes the use of a pump to dewater the interior of the cofferdam to define a dry working environment.

McClellan's invention is intended for construction of elongated structures (such as tunnels or piles) below a waterway where a physical barrier is submerged by sinking a physical structure at a desired location and dewatering the area inside the physical structure so that construction can take place. The application is not designed nor intended for contaminated sediment excavation and removal.

In contrast to the prior art, the invention being disclosed herein relates to the development of a system that isolates a dredge area and produces a negatively pressurized control zone into which mechanical or hydraulic dredging apparatus can be placed and used to remove contaminated sediment. The invention does not require the dewatering of the subject dredge area. The invention does not require the use of large columns to support a vessel. The invention is not susceptible to large gaps in the barrier that would result in major water infiltration, and the invention provides a practical means to deploy and redeploy the vessel during continuous dredging operations along a waterway. As will become apparent, the maintenance of this negatively pressurized control zone ensures a secure dredging operation that prevents the release of both particulate and soluble contaminants, and can be readily monitored and evaluated to establish or certify that the dredging operation has met its specified objectives. These features are not included in the prior art. In addition, the inventors have included a new method for managing dredge solids by securing and stabilizing said solids at the dredging site to minimize the opportunity for spills associated with conventional solids management approaches.

OBJECTS OF THE INVENTION

It is therefore an object of the invention to remove contaminated sediments from the bottom of lakes, rivers, reservoirs, and other water bodies in a manner that prevents the release and transport of particles or soluble contaminants from the dredge site during the dredging process.

It is also an object of the invention to establish boundaries of a dredge control zone where the excavation of sediments can occur in a contained manner.

It is a further object of this invention to make such a control zone mobile to permit redeploying the invention along a contaminated waterway.

It is a further object to establish a negative differential pressure between said dredge control zone and the ambient water environment.

It is yet another object of the invention to establish such a negatively pressurized control zone by deploying a sealed, vertical barrier wall beneath a marine vessel and by pumping water from the inner volume of the control zone to establish a differential pressure gradient between the control zone and the ambient water environment.

It is also a further object of the invention that such a sealed, vertical barrier will consist of sheets and sheet pile joint seals to respectively define the surface area and volume of the control zone, and to reduce the permeability through the joints of the sheets and hence the rate of flow required to establish said negatively pressurized control zone.

It is still a further object of the invention to treat water collected from the control zone during the pumping process with a polymeric membrane filtration treatment system to enable the discharge of this purified water back into the ambient environment.

It is yet a further object of the invention that such a polymeric membrane filtration treatment system be incorporated into a self-contained mobile water treatment vessel, to avoid the need for land-based facilities.

It is also a further object of this invention to incorporate mechanical and/or hydraulic dredging equipment for use within this control zone to improve the effectiveness of the subsurface cleanup.

It is a further object of this invention to provide the means to contain all resuspended contaminants within said control zone until such time as the dredge area can be certified as complying with the desired specification of the cleanup.

It is a further object of the invention to incorporate a dredge solids stabilization and transportation vessel that can manage the contaminated solids that are collected in the process and transport such solids to an off-loading facility in an environmentally sound manner.

SUMMARY OF THE INVENTION

In keeping with these and other objects of the invention, a system is described that provides for the containment of particles and contaminants by the use of a specially designed marine vessel that establishes a negatively pressurized dredge control zone that can be used with either mechanical or hydraulic dredging equipment to remove contaminated sediment. The physical boundary of the control zone is established by deploying a vertical barrier wall in the form of sheet piles and impermeable sheet joint seals located within and below an open barge-like vessel.

While the use of sheet piles and impermeable sheet joint seals can assist in establishing the physical boundary of the dredge control zone in which suspended contaminants are contained, the driving force used to ensure that neither soluble nor particulate contaminants are released from this zone during dredging operations is provided by the introduction of a pumping system located inside the control zone. This pumping system withdraws water from the control zone to establish a negative pressure gradient directed toward the inside of the control zone from the ambient water environment. Development of this negative pressure gradient between the ambient water surface and the control zone water surface elevation ensures that all flow through the vertical barrier is into the control zone, thereby preventing the release of any liquid or particulate matter contained within the confines of the control zone into the ambient water environment.

Liquid pumped from the control zone, where dredging occurs, can be expected to contain contaminated particulate matter and, in some cases, soluble contaminants that must be treated prior to disposal into the ambient water environment. To achieve the appropriate degree of treatment for the collected water, the invention makes use of a polymeric membrane treatment system capable of removing particulate matter in the range of 0.01 to 10 microns, and soluble contaminant removal, if warranted.

Most polymeric membrane filtration systems in commercial operation at the present time utilize positive pressure as a driving force to pass liquids through the membrane. In recent years, immersed vacuum-driven hollow fiber membranes have been introduced commercially. An immersed hollow fiber membrane filter operating under negative pressure is a polymeric filter that achieves filtration by drawing water through a thin fiber (membrane) surface into the hollow annular inner core of the fiber. Either pressurized or immersed hollow fiber membrane filtration systems are suitable for use in the subject application.

Once the subject control zone is established, dredging can be undertaken using either mechanical or hydraulic dredging techniques with assurance that any suspended material or soluble contaminants will be confined to the control zone or pumped out to the membrane treatment system for removal. As will subsequently be described, the preferred operational mode makes use of both mechanical and hydraulic dredging equipment to remove contaminated sediments.

To minimize the pumping rate required to maintain a differential elevation and hence a negative pressure gradient between the control zone and the ambient water environment, the inventors have incorporated a sheet pile joint seal into the system. This sheet pile joint seal is designed to reduce the flow of water through the joint between the individual sheet piles. Said sheet pile joint seal consists of a flexible shroud that is deployed from the vessel and slides down the outer portion of the vertical barrier wall to secure each sheet pile joint. The effectiveness of the flexible shroud is enhanced by the established pressure gradient, which acts to force the flexible shroud into the sheet pile joint, thereby reducing the flow of water through the joint.

To provide the means to effect the removal of contaminated sediments, to treat the collected water, and to manage all sediments without the need for land-based facilities in the vicinity of the cleanup, the inventors have developed a system in which all components of the subject invention are adaptable to mobile marine vessels. This includes the specially designed control zone vessel, referred to as a contaminated sediment removal vessel, a membrane water treatment vessel, and a solids stabilization and transportation vessel.

The system and vessels included in the invention are designed to provide mobile platforms that can readily be deployed and redeployed in order to provide for an ongoing cleanup over an extended length of contaminated waterway.

While other inventors have proposed physical barriers for separating a dredging area from an ambient waterway to prevent the escape of contaminated particulates, no prior inventions consider the use of a low pressure control zone that is not dewatered to achieve said objective. No prior invention considers the possibility of treating water pumped from said control zone. No prior invention provides the means to remove soluble contaminants that may be released during the excavation. No prior invention makes use of sheet piles deployed from a mobile vessel as the vertical barrier wall with the means to penetrate the channel bottom and bottom debris (e.g., logs and rock) if necessary to achieve a bottom seal. No prior invention provides for individual sheet pile joint seals that can readily be deployed to the desired depth, and can isolate and assist in sealing the low pressure control zone to prevent the outflow of contaminants and reduce the inflow of water into said zone. No prior invention provides the means to readily deploy and redeploy a vertical, low permeability barrier in a practical manner. No prior invention provides the means to manage solids without land-based solids handling facilities near the dredge site.

DESCRIPTION OF THE DRAWINGS

The present invention can be best understood in conjunction with the accompanying drawings in which:

FIGS. 13, 14, 15, and 16 present a series of plan and profile views of a membrane water treatment vessel.

DESCRIPTION OF THE PREFERRED EMBODIMENT

Figure 1:
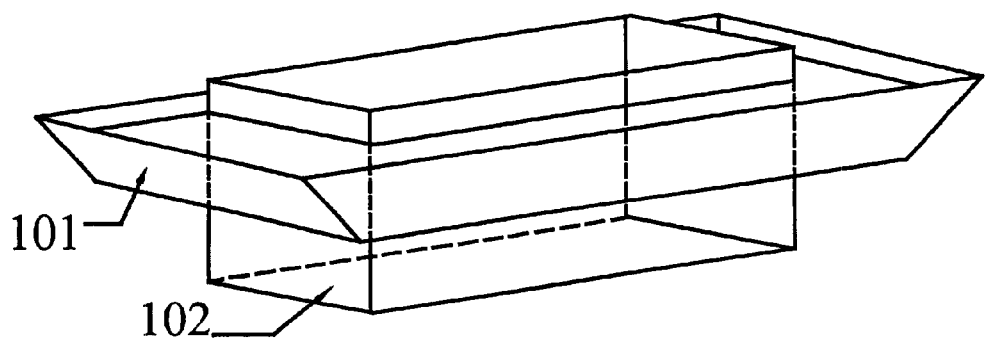
FIG. 1 is a conceptual perspective of a control zone within and below an opened bottom vessel.
Figure 2:
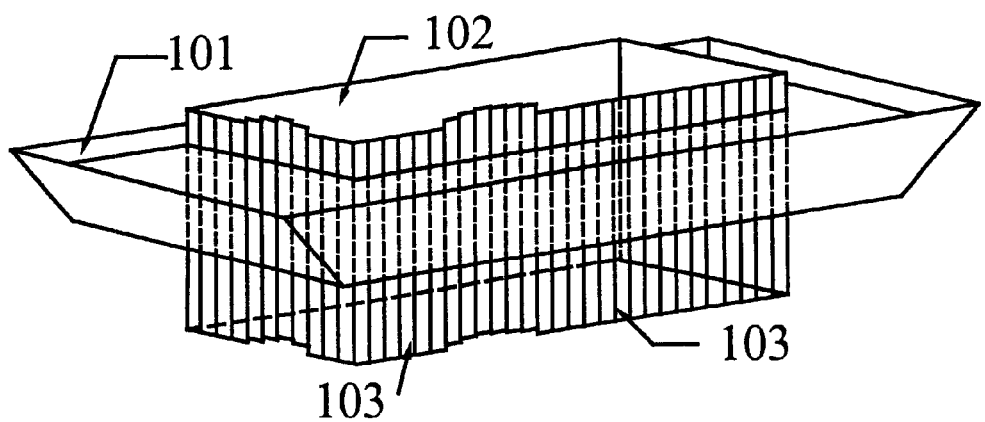
FIG. 2 is a conceptual perspective of a continuous wall of discrete sheet piles deployed within and below said vessel to define the limits of the control zone.

The present invention consists of a contaminated sediment removal vessel that is comprised of an open bottom barge vessel 101, shown in FIG. 1 in a perspective view, beneath which a dredge control zone 102 is established. As shown in the perspective view in FIG. 2, sheet piles 103 connected along the inner hull of said vessel can be deployed and vibrated into place on the bottom of the waterway from the interior four sides of the rectangular opening to define the physical boundary of said control zone.

Figure 3:
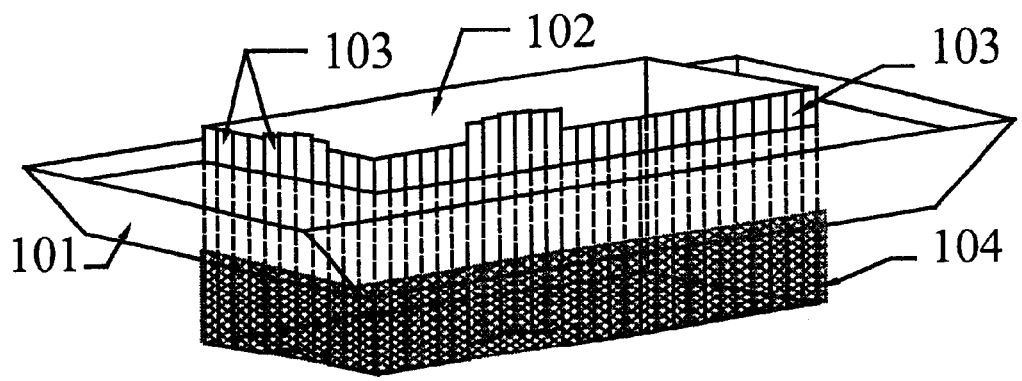
FIG. 3 is a conceptual schematic showing the deployment of a sheet pile-joint seal system design to reduce the flow of water through the sheet pile joints.

An additional feature of the invention, shown in the perspective view in FIG. 3, is the use of individual sheet pile joint seals 104 designed to reduce the flow of water through the sheet pile joints from the ambient water environment into the control zone. Such a sealing system can be readily deployed from the vessel. The sheet pile-seal system is used in conjunction with a water pumping operation to induce a negative pressure gradient inside of the control zone, relative to the external hydrostatic pressure outside the control zone. Inducing a negative pressure gradient prevents any liquid or particle migration from inside the control zone to the external water body during the dredging operation.

Figure 4:
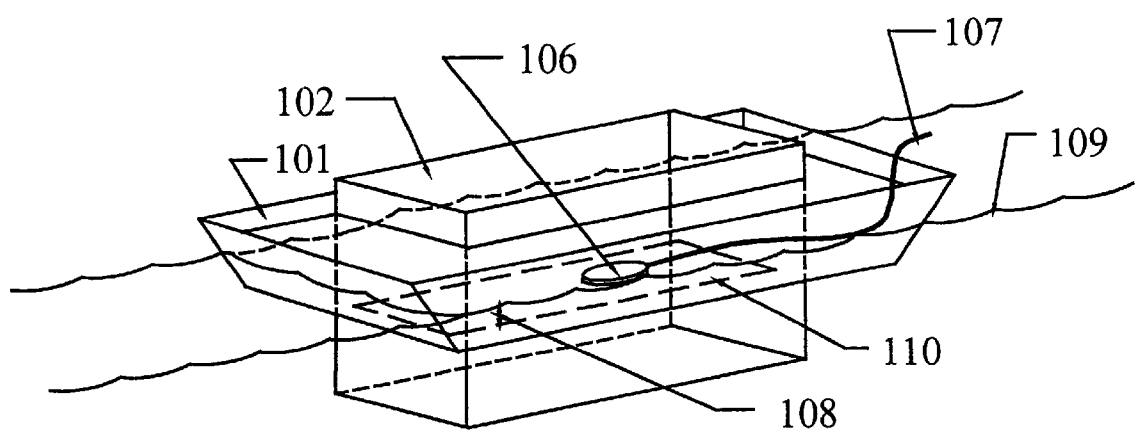
FIG. 4 is a schematic illustrating a floating skimmer-pumping system used to establish an elevation difference and hence pressure gradient between the inner control zone and external water environment.

To achieve this negative gradient, as shown in the perspective view in FIG. 4, a pumping system including a floating suction well or pump 106 is located within the control zone 101 and is connected by piping or hoses 107 to a water treatment vessel. FIG. 4 illustrates the development of a differential head or differential water elevation 108 between the ambient water surface 109 and the control zone water surface elevation 110. Such a differential head supplies the energy to induce the negative pressure gradient.

Figure 5:
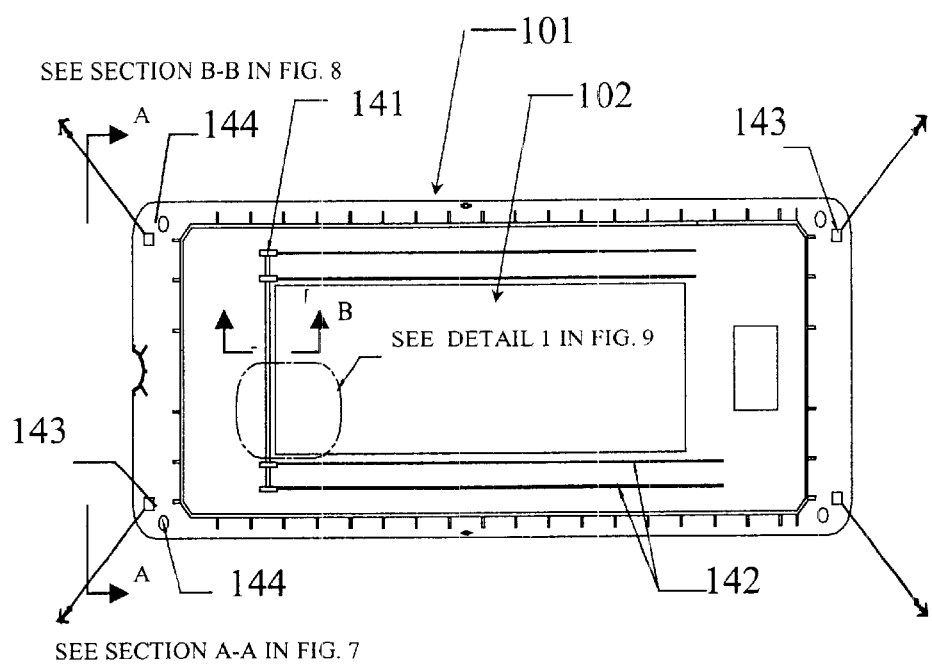
FIG. 5 is a plan drawing of a contaminated sediment removal vessel.
Figure 6:
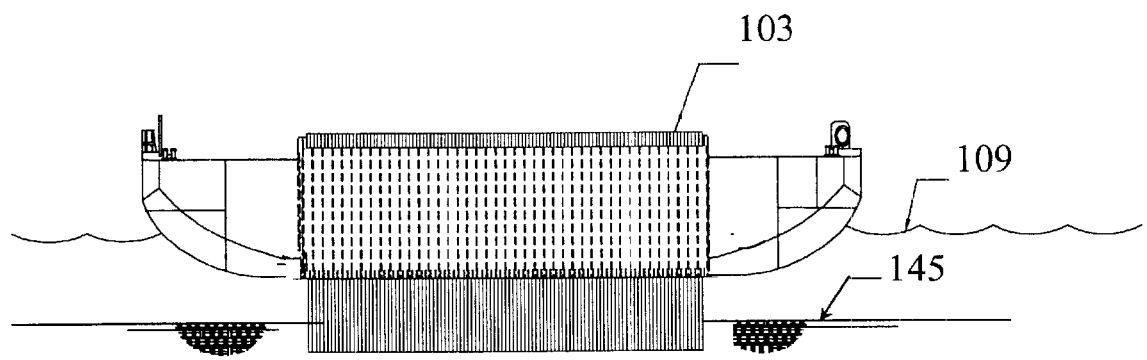
FIG. 6 is a profile drawing of a contaminated sediment removal vessel.

FIGS. 5 and 6 show plan and profile views, respectively, of the contaminated sediment removal vessel. FIG. 5 shows a plan view of the limits of the control zone 102 within the vessel 101. FIG. 5 also shows the location of a gantry 141 and gantry rails 142 used to direct the movement of a vibratory driver that assists in deploying and removing individual sheet piles during vertical barrier deployment and removal operations. Mooring winches 143 and spud wells 144, designed to establish the location of the vessel over the dredge zone, are also shown in FIG. 5. FIG. 6 shows the plurality of individual sheet piles 103, connected to the inner hull of the vessel floating atop of the water surface 109 above the river bottom 145 to be dredged.

Figure 7:
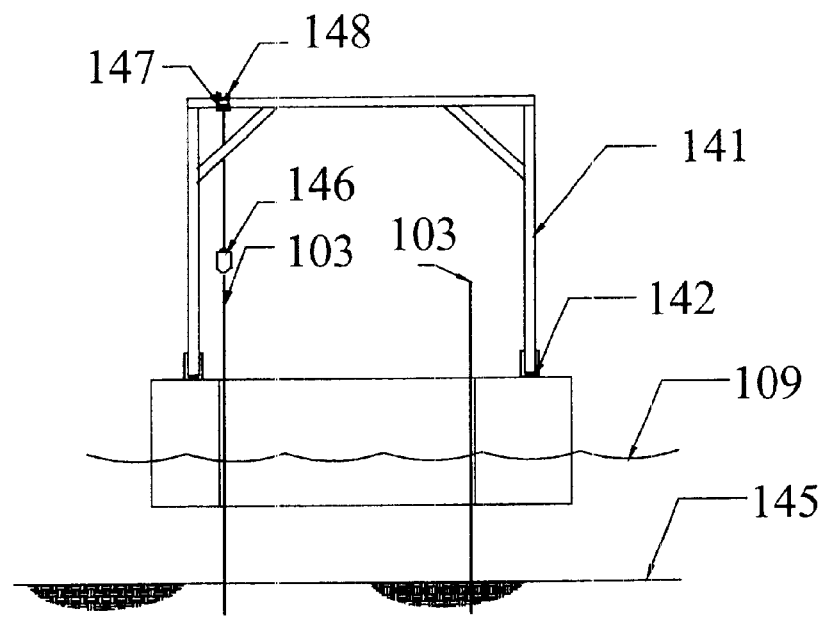
FIG. 7 shows Section A—A and FIG. 8 shows Section B—B from FIG. 5, both of which depict views of one possible gantry arrangement for deploying the sheet piles for the vertical barrier wall.
Figure 8:
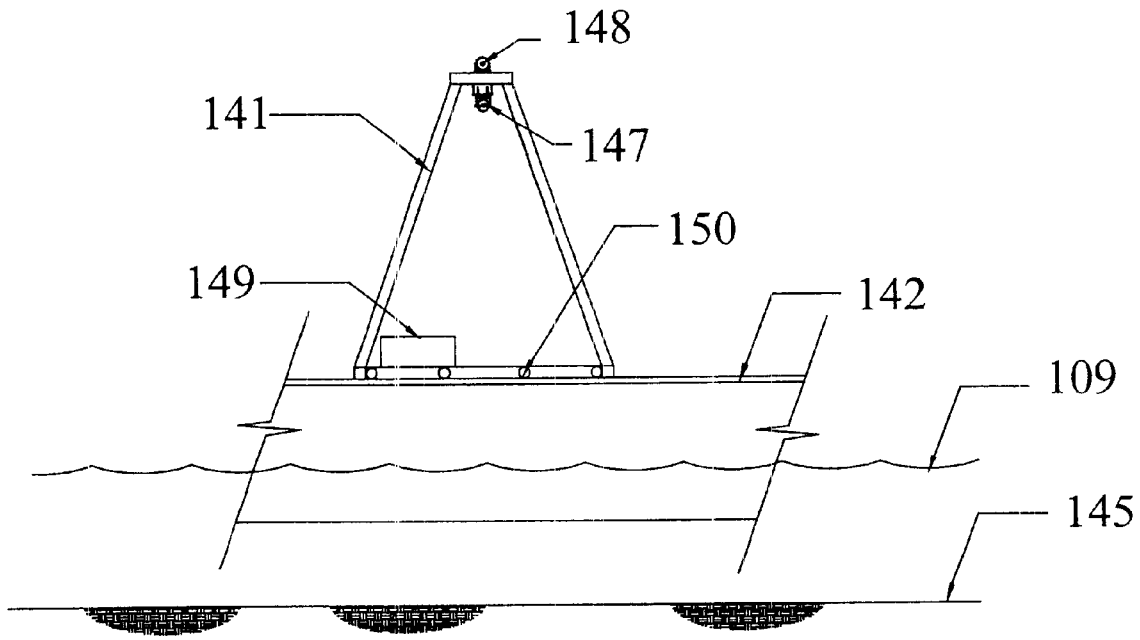

FIGS. 7 and 8 show views of Section A—A and Section B—B (from FIG. 5). These figures provide sectional views of the gantry 141, directing movement of a vibratory driver 146 traveling along the gantry rails 142. The vibratory driver 146 attaches to the tops of sheet piles 103 after having been moved into place by the trolley and hoist 147 having a hoist wheel 148. Also shown in FIG. 8 is a diesel hydraulic power pack mounted on the gantry 149 and motorized wheels 150.

Figure 9:
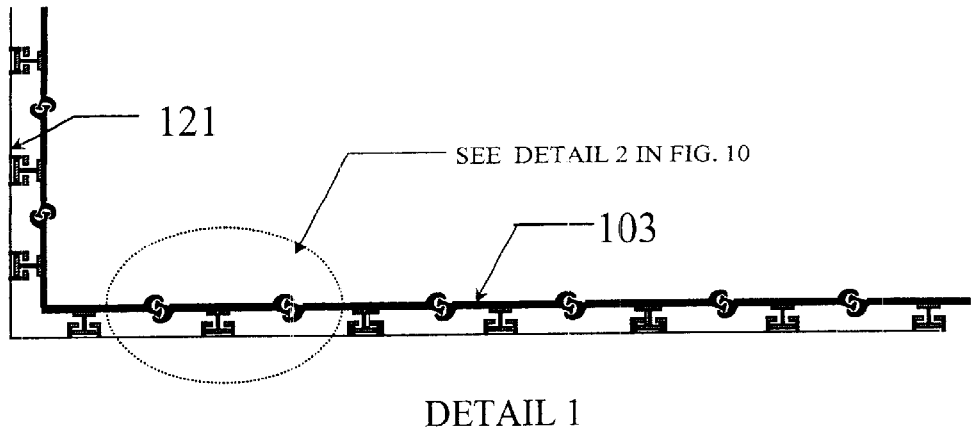
FIG. 9 is Detail 1, referred to in FIG. 5, which shows a plan view of the vertical barrier comprised of individual sheet piles connected at the joints.
Figure 10:
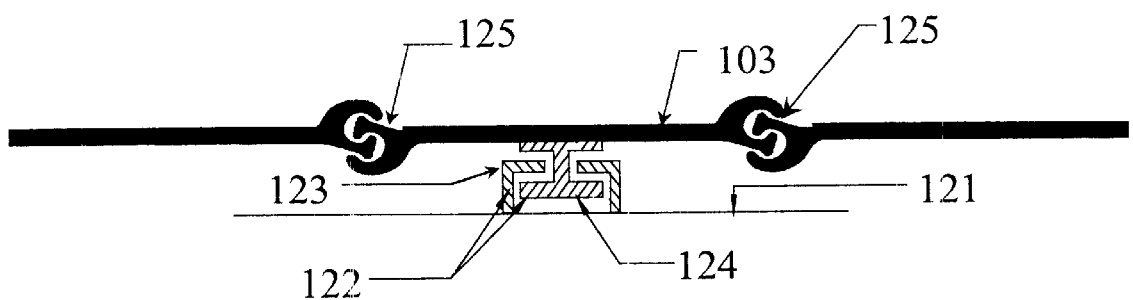
FIG. 10 is Detail 2, referred to in FIG. 9, which shows the configuration of the inner hull falsework on the contaminated sediment removal vessel.

FIG. 9 shows a plan view of a continuous wall of individual sheet piles 103 joined together by sheet pile joint interlocks and attached to the inner hull 121 by means of a falsework. FIG. 10 shows a detail of the inner hull 121 and said falsework 122, which consists of clips 123 and an H-beam 124 that is connected to an individual sheet pile 103. The individual sheet piles are shown connected side by side by an interlocking system. Said interlocking system typically consists of interlocking U-shaped sockets 125, as shown in FIG. 10.

Figure 11:
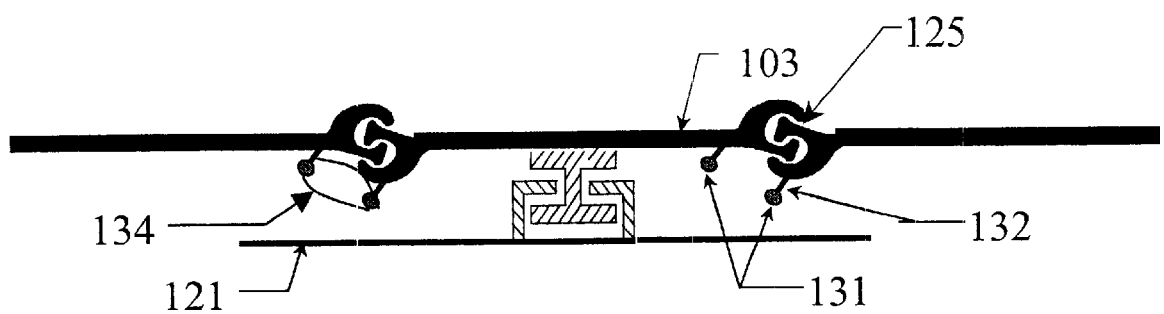
FIG. 11 presents a schematic of the support arrangement for the joint seal shroud.
Figure 12:
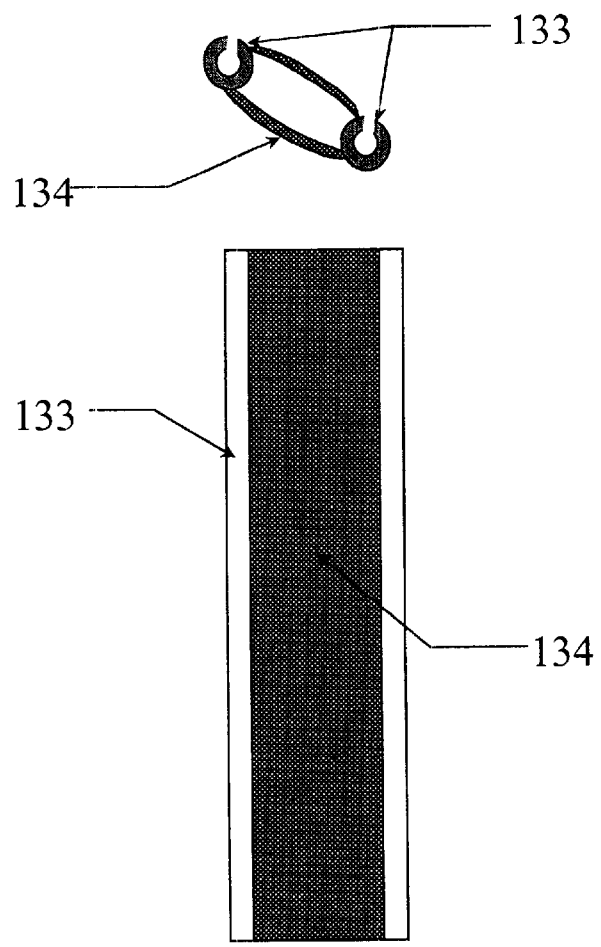
FIG. 12 shows a plan profile view of the joint seal shroud.

To assist in sealing the seams of the interlocking sheet pile joints, which can be a source of water infiltration into the control zone, the inventors have developed a joint seal system capable of being deployed from the top of the vessel during mobilization of the vertical barrier. Reducing water infiltration into the control zone is necessary to reduce the pumping rate required to maintain the negative pressure gradient between the control zone and ambient water environment. The subject joint seal system, shown in FIGS. 11 and 12, consists of a flexible shroud that seals the joint between the sheet piles. To permit deployment of said shroud from the deck of the contaminated sediment removal vessel, two circular rods 131 are welded onto the edge of a flat plate 132. Each rod and plate is welded to the edge of each sheet pile 103 where the U-shaped sockets 125 from adjacent sheet piles are attached. The circular rod and plate run the entire vertical length of the sheet pile. The two circular rods 131 at each joint, shown in FIG. 11, provide a sliding and locking mechanism over which slotted tubes 133, shown in FIG. 12, can slide over the circular rods 131 to deploy the seal shroud 134. The seal shroud 134 is a flexible rubber membrane (such as neoprene) that is attached to the ends to the two hollow rods 133. It is preferable to attach two rubber membranes to the front and rear face of the slotted tubes. During operations the shroud acts to seal the sheet pile joint by pressing up to and penetrating the joint. This penetration is enhanced by the pressure differential established by the difference in elevation between the control zone and the ambient water body. Since the shroud is deployed on the outside surface of the vertical sheet pile barrier, the pressure differential established, between the external waterway and the control zone, forces the shroud into the sheet pile joint, thereby reducing the sheet pile joint infiltration flowrate. In addition, the location of the joint seal, which is external to the sheet pile joint, eliminates potential interference with sheet pile deployment.

While FIGS. 9, 10, and 11 depict a flat sheet pile section, a U-shaped interlocking mechanism, and a clip and H-beam falsework pile arrangement, the presentation of such configurations is not intended to limit the fact that alternative sheet pile sections, interlocking mechanisms, and falsework arrangements could be employed to establish the vertical barrier wall and to permit deployment of the shroud seal in the manner outlined above without departing from the objectives and essence of the invention.

To treat the water pumped from the control zone, the inventors have supplemented the dredging process with a membrane water treatment system, adapted for deployment on a barge or water treatment vessel. Those who are versed in the art of membrane filtration design will recognize that complete rejection of all micron-sized and submicron sized particles (for example, greater than 0.1 micron) can readily be attained by using such membrane filtration technology. The referenced vessel is capable of treating soluble contaminants utilizing microfiltration or ultrafiltration membrane technology or alternative commercial methods for soluble contaminant removal such as chemical precipitation for soluble metals or activated carbon treatment for soluble organics or reverse osmosis (if soluble contaminant removal is necessary). Since most contaminants (particularly organics) are tightly bound to free particulate matter, microfiltration should, in most cases, be capable of effecting adequate treatment.

FIGS. 13, 14, 15, and 16 show design views through a mobile water treatment vessel containing a low pressure hollow fiber membrane treatment system. FIG. 13 shows the main deck plan view of such a vessel 151 and includes an equipment room 152, a main deck enclosure 153 to house the membrane module racks (four shown) 154, and tank hatch covers 155 that cover the equalization and pretreatment tanks, located below deck, as shown in FIGS. 14, 15, and 16. Also shown in FIG. 13 is a hydraulic crane 156 used to remove the hatch covers and to lift and offload solids collection containers from the vessel.

FIG. 14 shows a plan view of the hold level, highlighting the location of the equalization and pretreatment tanks 157 (nine shown) and fuel tank 158. Also shown in FIG. 14 is the location of a solids thickening tank 159 that is used to thicken settled solids, collected from the pretreatment membrane treatment systems, a solids stabilization tank 161 where solids are mixed with a cementitious stabilization reagent (such as Portland cement) to improve its handleability, and the anchor chain locker 162.

FIG. 15 shows a profile view of the vessel depicting the aforementioned equipment room 152, the membrane module racks 154, the equalization and pretreatment tanks 157, and equalization and pretreatment tank hatch covers 155. Also depicted in FIG. 15 are a tug push notch 163 and an anchor windlass 164.

FIG. 16 shows a section through the water treatment vessel further highlighting the main deck enclosure 153, the membrane module racks 154 located below deck, and the equalization and pretreatment tanks 157.

The design layout shown in FIGS. 13 through 16 can be readily modified to accommodate the installation of an immersed pressurized membrane system or supplementary treatment operations. Its presentation is in no way intended to limit the scope of the application to either low pressure or immersed membrane systems and is intended only to illustrate additional detail associated with the self-contained treatment vessel concept.

Figure 17:
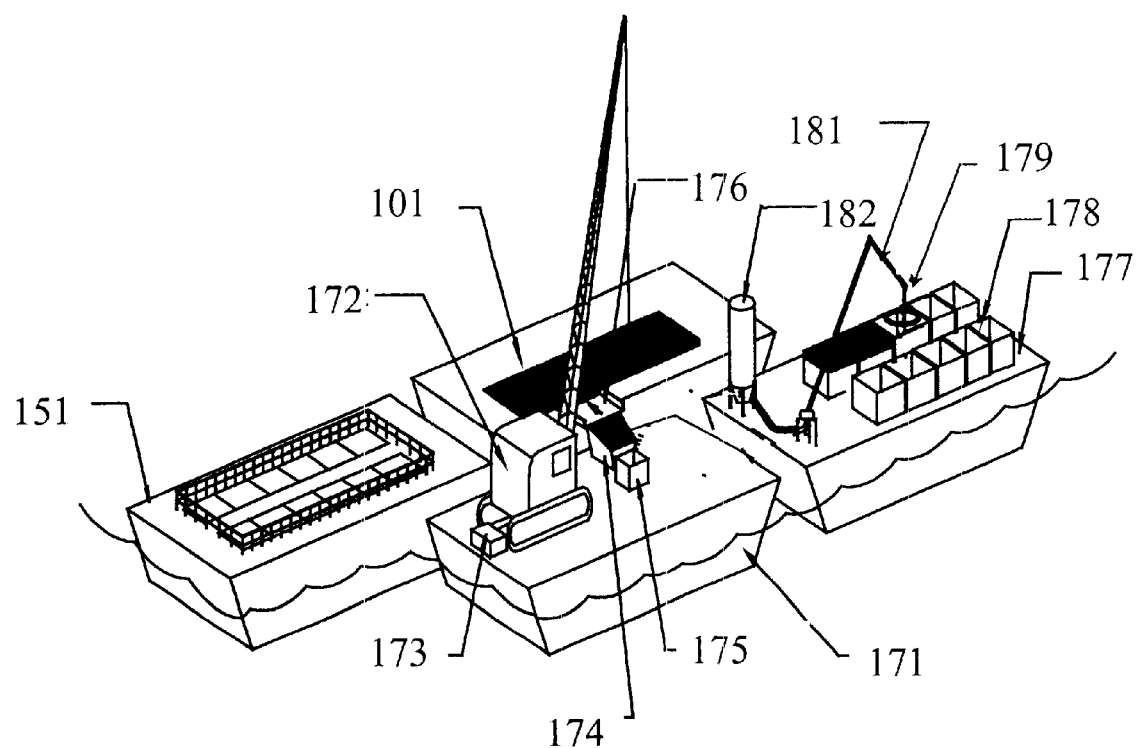
FIG. 17 is an isometric view of the individual vessels used in an integrated on-water dredging operation.

An isometric view in FIG. 17 shows an integrated dredging system, which includes a water treatment vessel 151, a contaminated sediment removal vessel 101, a crane barge 171 with supporting crane 172, its power generator 173, a hopper screening plant 174, and a container 175 for oversized rocks and debris collection, and a containment ramp 176 to connect said contaminated sediment removal vessel 101 with the crane barge 171 to prevent spillage of sediment during the excavation process. Also shown in FIG. 17 is a solids stabilization and transportation vessel 177 with storage containers 178, a jiffy-type blade mixer 179, and a telescoping crane with pump 181 for injecting and mixing a cementitious stabilizing reagent (such as Portland cement) with the contaminated dredge mud, and a silo 182 to store said stabilizing reagent.

Figure 18:
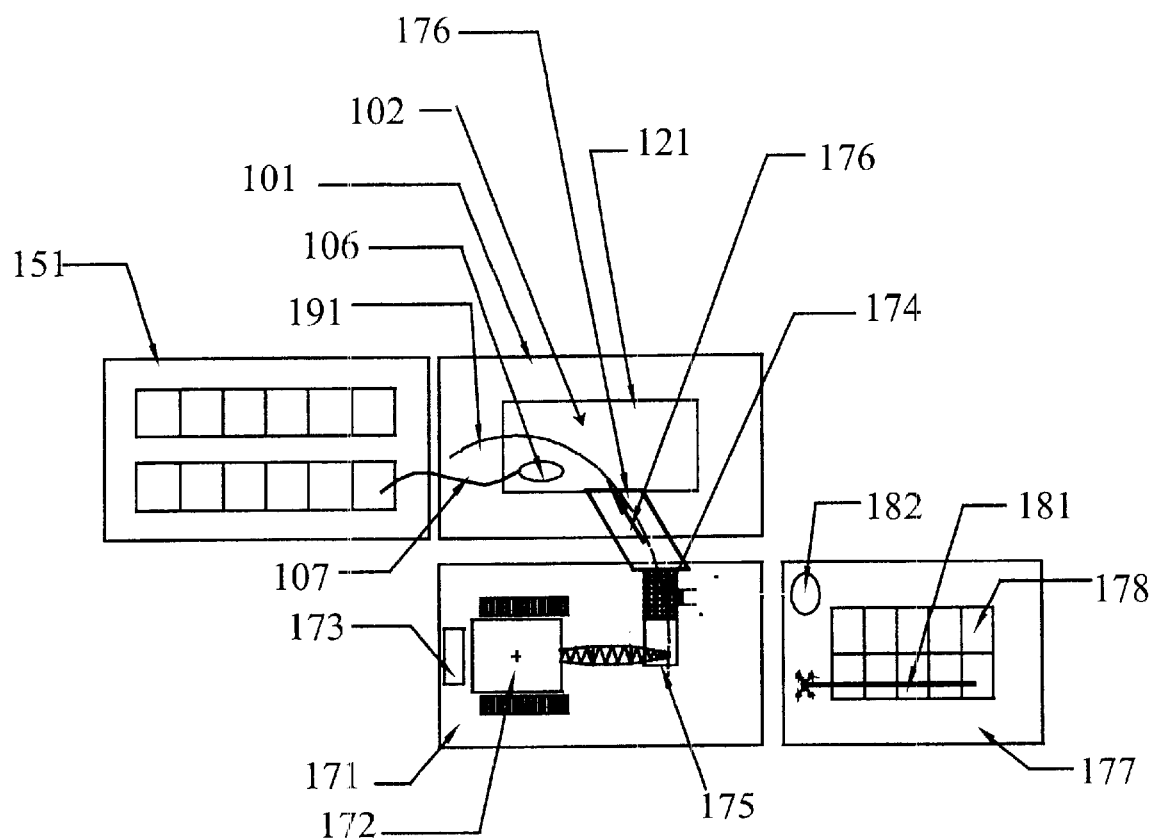
FIG. 18 is a plan view of said vessels.

A plan view of these operations is depicted in FIG. 18, which shows the location of the water treatment vessel 151, contaminated sediment removal vessel 101, the crane barge 171 and the solids stabilization and transportation vessel 177. Also shown in FIG. 18 on the contaminated sediment removal vessel 101 is the control zone pump 106 and piping 107 from the control zone 102 to the water treatment vessel 151, as well as the expected arc traveled by the crane 191 over the containment ramp 176 during excavation operation.

The multiple vessel arrangement and the equipment shown in FIGS. 17 and 18 depict one potential vessel and equipment configuration. Its presentation is in no way intended to limit the manner in which vessels can be deployed at a cleanup site, which vessel might support a specific piece of equipment or operation, nor the type of dredging equipment that may be employed to remove the sediment, since this will, in most cases, be dictated by the size of channel or other site-specific issues. For example, where channel space is limited, the vessels could be configured linearly or the crane could be deployed on the contaminated sediment removal vessel 101, eliminating the need for a crane barge 171. It may also be desirable in certain instances to utilize a hydraulic excavator as opposed to a crane as the preferred equipment in the excavation process. The presentation shown is also not intended to limit the preferred number of each vessel located at a particular dredge site. For example, in most cases it would be preferable to have one water treatment vessel 151 supporting multiple contaminated sediment removal vessels 101 to reduce the number of vessels required for the dredging operation. Deploying several contaminated sediment removal vessels 101 may also be advantageous, from an operational viewpoint, since it provides the means for the crane barge 171 to move from one control zone 102, located within each contaminated sediment vessel 101, to the next control zone 102 without slowing the excavation process (waiting to redeploy the contaminant sediment removal vessel 101). Neither is the depiction of one control zone 102 within a given contaminated removal vessel 101 intended to limit the number of control zones 102 that might be established on one vessel. For example, it might be advantageous to have several control zones 102 on one large contaminated sediment removal vessel 101.

Figure 19:
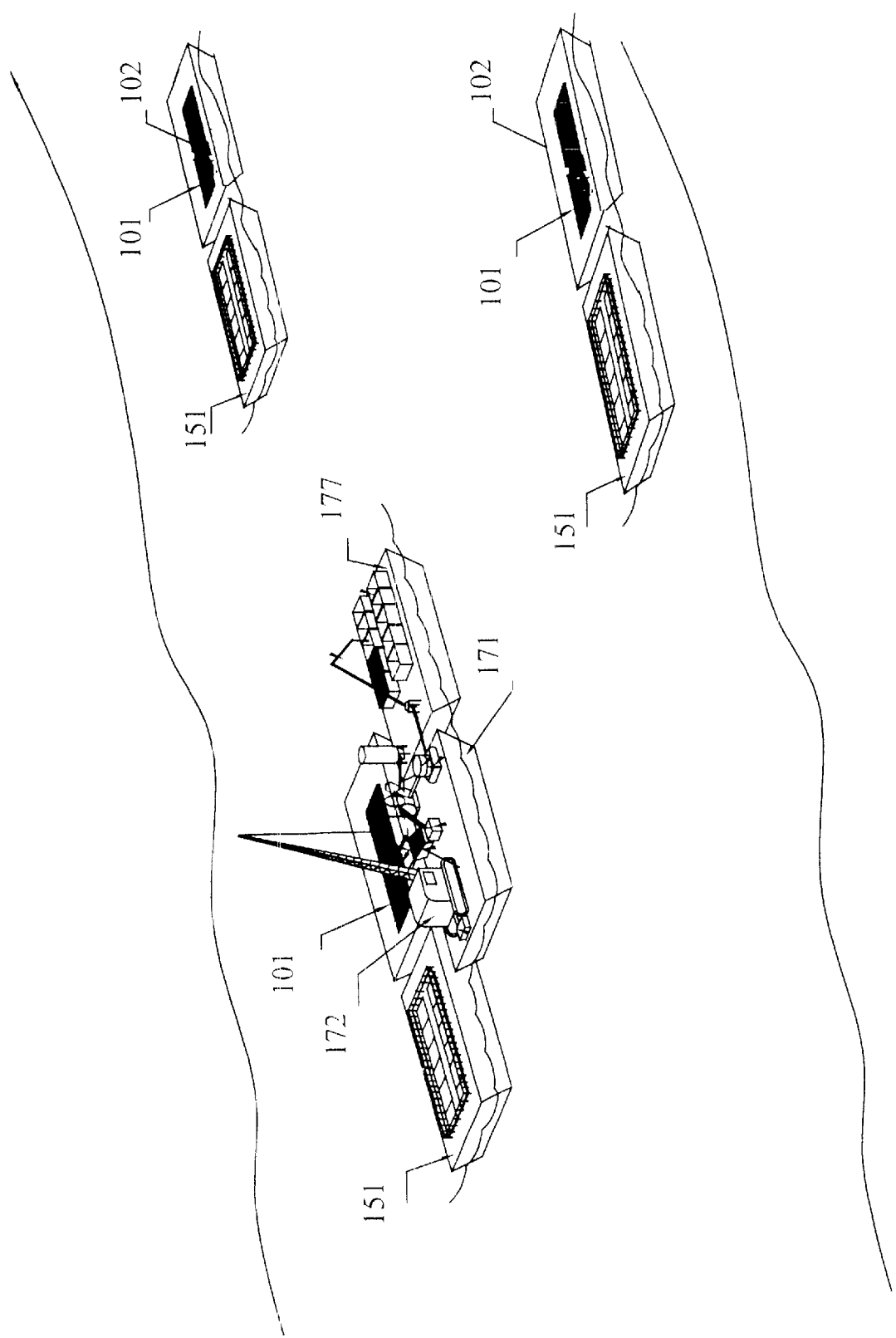
FIG. 19 is an isometric view of a plurality of vessels deployed on a water body.

In summary, in a preferred embodiment for the secure dredging embodiment shown in FIGS. 1 through 8, operation of the overall system involves the following activities:

FIG. 19 shows a plurality contaminated sediment removal vessels 101 including control zones 102 and water treatment vessels 151 deployed along a waterway.

Figure 20:
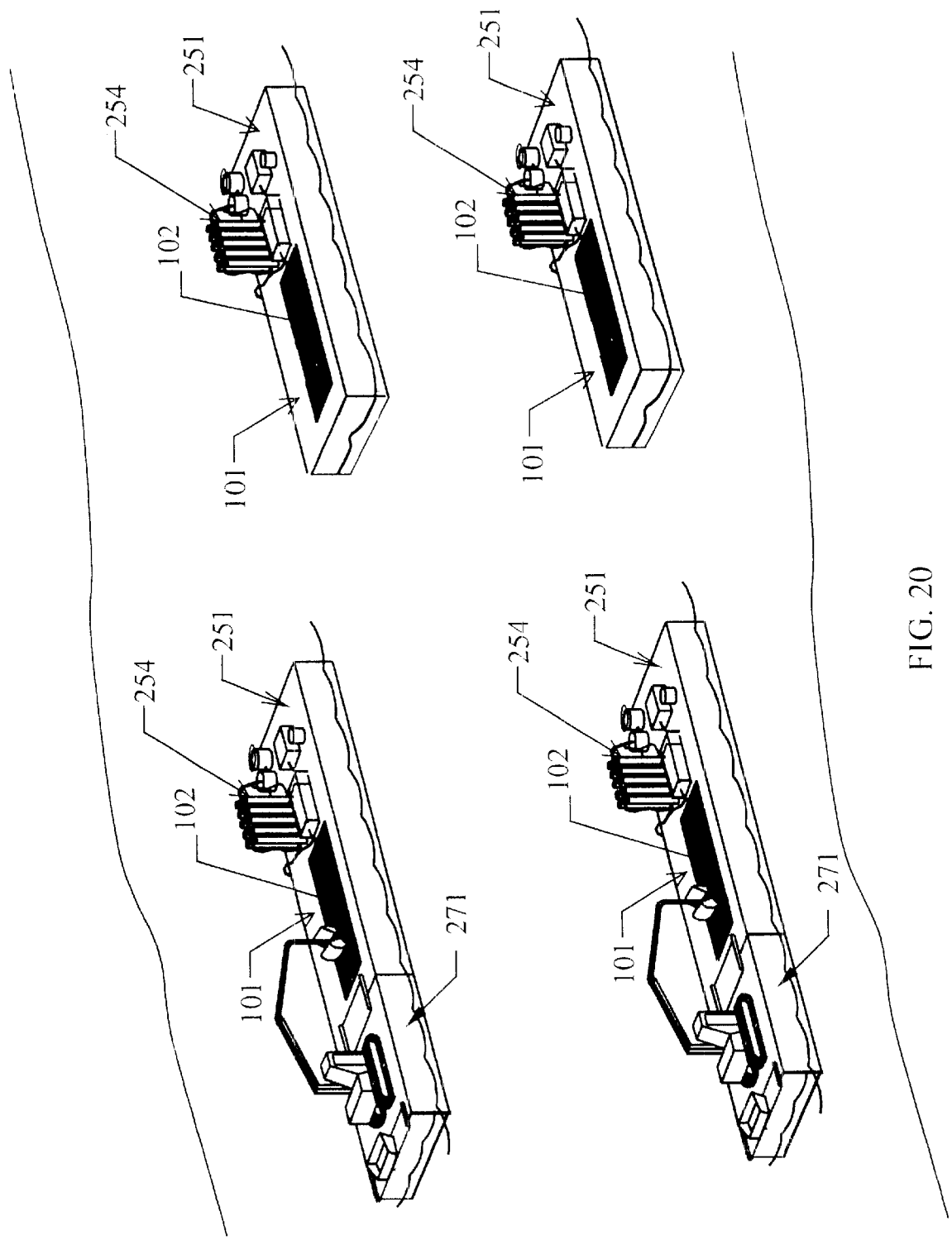
FIG. 20 is an isometric view of a plurality of vessels deployed on a water body where the water treatment system is located on the contaminated sediment removal vessel.

FIG. 20 shows a plurality of contaminated sediment removal vessels 101 and a plurality of control zones 102 deployed along a water body with a plurality of water treatment systems 254 shown on the deck 251 of a plurality of floating contaminated sediment removal vessels 101 adjacent to a plurality of crane vessels 271.

1. positioning of the vessel 102 over the zone 101 to be dredged;
2. lowering and inserting of sheet piles 103, attached to the inner hull 121, into the bottom 145 of the waterway and driving them into the subsurface formation with the driver, such as the vibrating hammer 146, if necessary;
3. lowering the impermeable shroud 104 located on the external side of the sheet wall 103 to the bottom sediments 145;
4. initiating flow into the water treatment system 151 to induce a negative pressure gradient into the control zone 101;
5. initiating and completing a mechanical dredging operation to remove contaminated sediments from the control zone 101;
6. continuing to pump and treat control zone water after the completion of the excavation to maintain the negative pressure gradient, and to reduce suspended solids and/or soluble contaminants in the water column within the control zone to specified levels;
7. permitting the solids to settle for an extended period (e.g., 12 to 24 hours) after dredging of the control zone 101 is completed;
8. vacuum dredging the bottom 145 of the control zone 101 using a cutterless vacuum head to remove settled particulate matter (fluff), and directing the vacuumed slurry to the water treatment system 151;
9. monitoring the water column and bottom sediments to ensure adequate cleanup;
10. withdrawing the shroud 104, which consists of the slotted tubes 133 and flexible rubber membrane 134, and sheet piles 103;
11. relocating the contaminated sediment removal vessel 102 to the next area to be dredged using mooring winches and spuds,
12. redeploying the vertical barrier and seals in order to reinitiate the dredging operation,
13. processing the contaminated dredge solids by screening oversize materials 174 and storing such materials in an oversize storage container 175;
14. transferring the finer-grained dredge muds to the solids stabilization and transportation barge 177 where said muds are stabilized in storage containers 178, using a jiffy-type mixing device 179 that simultaneously introduces and mixes the stabilizing reagent with the contaminated mud; and
15. covering storage containers 178 and securely transporting stabilized muds to an off-loading facility.

Although the aforementioned particular embodiments are shown and described herein, it is understood that various other modifications may be made without departing from the scope of the invention, as noted in the appended claims.

We claim:

1. A self-contained mobile marine system for extraction of contaminated sediments and dredge materials from the bottom of a water body comprising:
   at least one floating marine vessel,
   said at least one floating marine vessel having suspendable therefrom at least one continuous mobile/submersible vertical barrier wall defining at least one predetermined confined dredge control zone, said vertical barrier wall comprised of individual movable sheets capable of contouring to the bottom of the surface of the waterway; said control zone continuously containing water of the water body on respective outer and inner sides of said vertical barrier wall, said confined dredge control zone containing liquid and suspended particles dispersed in a sediment excavation process from a predetermined bottom sediment surface area below said at least one floating marine vessel, said at least one floating marine vessel continuously floating during said sediment excavation process.

2. The self-contained mobile marine system as in claim 1 wherein said at least one floating marine vessel is a plurality of vessels.

3. The self-contained mobile marine system as in claim 1 wherein said at least one control zone is a plurality of control zones.

4. The self-contained mobile marine system as in claim 1 further comprising a dredging operation removing contaminated sediments from said at least one control zone.

5. The self-contained mobile marine system as in claim 1 wherein said dredging operation is a mechanical dredging operation removing contaminated sediments from said at least one control zone.

6. The self-contained mobile marine system as in claim 1 wherein said dredging operation is a hydraulic operation removing contaminated sediments from said at least one control zone.

7. The self-contained mobile marine system as in claim 1 wherein said dredging operation is aboard said at least one floating marine vessel.

8. The self-contained mobile marine system as in claim 1 wherein said dredging operation is aboard a further floating marine vessel adjacent to said at least one floating marine vessel.

9. The self-contained mobile marine system as in claim 1 wherein said at least one mobile/submersible vertical barrier wall defining at least one predetermined confined dredge control zone comprises at least one predetermined collection perimeter of a plurality of adjacent aligned sheet piles attached to an inner hull of said at least one floating marine vessel, said sheet piles being lowerable and driven into the area of bottom sediments, said at least one collection of said sheet piles defining a perimeter area encompassing a predetermined volume of said at least one control zone, said adjacent aligned sheet piles each having respective integral sockets joining a respective socket of each adjacent sheet pile.

10. A self-contained mobile marine system for extraction of contaminated sediments and dredge materials from the bottom of a water body comprising:

at least one floating marine vessel, said at least one floating marine vessel having suspendable therefrom at least one continuous mobile/submersible vertical barrier wall defining at least one predetermined confined dredge control zone, said confined dredge control zone containing liquid and suspended particles dispersed in a sediment excavation process from a predetermined bottom sediment surface area below said at least one floating marine vessel, wherein said at least one mobile/submersible vertical barrier wall defining at least one predetermined confined dredge control zone comprises at least one predetermined collection perimeter of a plurality of adjacent aligned sheet piles attached to an inner hull of said at least one floating marine vessel, said sheet piles being lowerable and driven into the area of bottom sediments, said at least one collection of said sheet piles defining a perimeter area encompassing a predetermined volume of said at least one control zone, wherein at least one gantry and a plurality of gantry rails direct the movement of a vibratory driver alternately deploying and removing said sheet piles during deployment of said at least one vertical barrier wall and subsequent removal of the contaminated sediments from beneath said at least one control zone.

11. The self-contained mobile marine system as in claim 9 wherein said sheet piles of said at least one continuous vertical barrier wall are joined together by sheet pile joint interlocks to said inner hull of said at least one floating marine vessel.

12. The self-contained mobile marine system as in claim 11 wherein each said interlock is joined to adjacent sheet piles by a falsework of clips and an H-beam connected to each said sheet pile, locking said sheet piles to said inner hull of said at least one floating marine vessel.

13. The self-contained mobile marine system as in claim 11 wherein each said interlock includes an interlocking socket.

14. The self-contained mobile marine system as in claim 13 wherein each said interlocking socket is U-shaped.

15. A self-contained mobile marine system for extraction of contaminated sediments and dredge materials from the bottom of a water body comprising:

at least one floating marine vessel, said at least one floating marine vessel having suspendable therefrom at least one continuous mobile/submersible vertical barrier wall defining at least one predetermined confined dredge control zone, said confined dredge control zone containing liquid and suspended particles dispersed in a sediment excavation process from a predetermined bottom sediment surface area below said at least one floating marine vessel, wherein said at least one mobile/submersible vertical barrier wall defining at least one predetermined confined dredge control zone comprises at least one predetermined collection perimeter of a plurality of adjacent aligned sheet piles attached to an inner hull of said at least one floating marine vessel, said sheet piles being lowerable and driven into the area of bottom sediments, said at least one collection of said sheet piles defining a perimeter area encompassing a predetermined volume of said at least one control zone; and, at least one vertically extending flexible impermeable shroud seal on an exterior side of said at least one collection of sheet piles.

16. The self-contained mobile marine system as in claim 15 wherein said at least one flexible impermeable shroud seal is deployed by lowering a plurality of fasteners axially aligned to said at least one flexible impermeable shroud seal over further fasteners axially aligned to said at least one flexible impermeable shroud seal, said further fasteners attached to said sheet piles and thence to and below the bottom sediment area surface.

17. The self-contained mobile marine system as in claim 16 wherein said fasteners are hollow rods and said further fasteners are circular rods insertable into said hollow rods, said hollow rods being attached to a respective plate joined to each said respective sheet pile.

18. The self-contained mobile marine system as in claim 15 further wherein said at least one flexible impermeable shroud seal presses up to and seals respective joints between said adjacent sheet piles, thereby reducing flow of water through each joint.

19. The self-contained mobile marine system as in claim 1 further comprising at least one pumping system located in said at least one control zone, wherein said at least one pumping system withdraws water from said at least one control zone, thereby establishing a negative pressure gradient directed toward said inside of said at least one control zone from the ambient water environment, said negative pressure gradient between the ambient water environment and said control zone water controlling flow of water through said at least one vertical barrier wall into said at least one control zone, thereby preventing release of any contaminated liquid or particulate matter contained within said predetermined confines of said at least one control zone into the ambient water environment.

20. A self-contained mobile marine system for extraction of contaminated sediments and dredge materials from the bottom of a water body comprising:

at least one floating marine vessel, said at least one floating marine vessel having suspendable therefrom at least one continuous mobile/submersible vertical barrier wall defining at least one predetermined confined dredge control zone, said confined dredge control zone containing liquid and suspended particles dispersed in a sediment excavation process from a predetermined bottom sediment surface area below said at least one floating marine vessel, at least one pumping system located in said at least one control zone, wherein said at least one pumping system withdraws water from said at least one control zone, thereby establishing a negative pressure gradient directed toward said inside of said at least one control zone from the ambient water environment, said negative pressure gradient between the ambient water environment and said control zone water controlling flow of water through said at least one vertical barrier wall into said at least one control zone, thereby preventing release of any contaminated liquid or particulate matter contained within said predetermined confines of said at least one control zone into the ambient water environment; and, wherein said at least one vertical barrier wall, including said sheet piles and said at least one flexible impermeable shroud seal respectively, defines a predetermined surface area and volume of said at least one control zone, said at least one sealed vertical barrier wall reducing permeability through said joints between said sheet piles, said sealed vertical barrier wall and said at least one pumping system establishing a predetermined rate of flow of water controlling said negative pressurization of said at least one control zone and forming a negative pressure gradient therein.

21. A self-contained mobile marine system for extraction of contaminated sediments and dredge materials from the bottom of a water body comprising:
  at least one floating marine vessel,
  said at least one floating marine vessel having suspendable therefrom at least one continuous mobile/submersible vertical barrier wall defining at least one predetermined confined dredge control zone,
  said confined dredge control zone containing liquid and suspended particles dispersed in a sediment excavation process from a predetermined bottom sediment surface area below said at least one floating marine vessel, at least one pumping system located in said at least one control zone, wherein said at least one pumping system withdraws water from said at least one control zone, thereby establishing a negative pressure gradient directed toward said inside of said at least one control zone from the ambient water environment, said negative pressure gradient between the ambient water environment and said control zone water controlling flow of water through said at least one vertical barrier wall into said at least one control zone, thereby preventing release of any contaminated liquid or particulate matter contained within said predetermined confines of said at least one control zone into the ambient water environment; and,
  a water level monitoring system to maintain said negative pressure gradient between said control zone and the ambient water environment.

22. The self-contained mobile marine system as in claim 1 further comprising at least one water treatment system collecting and treating particulate matter and soluble contaminants distributed and/or resuspended during the excavation process.

23. The self-contained mobile marine system as in claim 22 wherein said at least one water treatment system comprises at least one membrane filtration system capable of removing particulate matter and soluble contaminants, obtained within said at least one control zone.

24. A self-contained mobile marine system for extraction of contaminated sediments and dredge materials from the bottom of a water body comprising:
  at least one floating marine vessel;
  said at least one floating marine vessel having suspendable therefrom at least one continuous mobile/submersible vertical barrier wall defining at least one predetermined confined dredge control zone;
  said confined dredge control zone containing liquid and suspended particles dispersed in a sediment excavation process from a predetermined bottom sediment surface area below said at least one floating marine vessel;
  at least one water treatment system collecting and treating particulate matter and soluble contaminants distributed and/or resuspended during the excavation process;
  wherein said at least one water treatment system comprises at least one membrane filtration system capable of removing particulate matter and soluble contaminants, obtained within said at least one control zone; and,
  wherein said at least one membrane filtration system is aboard said at least one floating marine vessel having said at least one control zone.

25. The self-contained mobile marine system as in claim 23 wherein said at least one membrane filtration system is aboard at least one further separate floating vessel spaced apart from said at least one floating marine vessel.

26. The self-contained mobile marine system as in claim 23 wherein said particulate matter is in the range of 0.01 to 10 microns.

27. The self-contained mobile marine system as in claim 23 wherein said at least one membrane treatment filtration system is a plurality of filtration systems.

28. The self-contained mobile marine system as in claim 23 wherein said at least one filtration system is a microfiltration system.

29. The self-contained mobile marine system as in claim 23 wherein said at least one filtration system is an ultrafiltration system.

30. The self-contained mobile marine system as in claim 23 wherein said at least one filtration system passes liquids through a membrane under positive pressure.

31. The self-contained mobile marine system as in claim 23 wherein said at least one filtration system passes liquids through a membrane under negative pressure.

32. The self-contained mobile marine system as in claim 23 wherein said at least one membrane filtration system comprises hollow fiber membrane filtration means.

33. The self-contained mobile marine system as in claim 23 wherein said at least one vessel includes at least one treatment system comprising a series of stages for treatment of collected contaminated water prior to disposal, including a first stage having a flow equalization stage for presettling out particles with high specific gravity, and a second stage having said at least one membrane filtration system, said at least one membrane filtration system removing very fine colloidal-sized particles remaining in the water after said first stage treatment and a soluble contaminant removal stage to provide optional tertiary treatment.

34. The self-contained mobile marine system as in claim 33 wherein said at least one treatment system comprises a solids handling system further comprising a solids thickening tank thickening settled solids collected from said membrane treatment system and a further solids stabilization tank mixing said solids with a cementitious stabilization reagent.

35. The self-contained mobile marine system as in claim 1 further comprising a marine-based solids handling system stabilizing said excavated sediments into a solid disposable member transferable to an on-shore handling facility.

36. The self contained mobile marine system as in claim 35 further comprising a screening means to segregate oversize material dredged from undersize material dredged, to facilitate stabilization of said undersize material dredged.

37. The self-contained mobile marine system as in claim 35 further comprising at least one further floating vessel having at least one holding container isolating the storage and containment of material dredged from said predetermined control zone.

38. The self-contained mobile marine system as in claim 35 further comprising a blade mixer and a telescoping crane with a further pump injecting and mixing said cementitious stabilizing reagent with said contaminated dredge and a silo storing said stabilizing reagent.

39. The self-contained mobile marine system as in claim 1 further comprising a global positioning navigation system (GPS) directing movement of said at least one mobile marine vessel to a new further control zone.

40. A method for removing micron-sized and sub-micron sized suspended particulates from a subsurface floor below a body of water comprising the steps of:
  positioning a treatment vessel over said zone to be dredged;
  lowering and inserting a plurality of sheet piles adjacent to a inner hull of said vessel into the bottom of the body of water and driving said piles into the subsurface formation to form a continuous loop surrounding said predetermined control zone;

lowering an impermeable shroud seal located on an external side of said continuous loop of said sheet piles to the subsurface floor of the body of water;

initiating fluid flow into said at least one treatment vessel to induce a negative pressure gradient into said predetermined control zone;

initiating a mechanical dredging operation to remove contaminated sediments from said control zone.

41. The method for removing micron-sized and sub-micron sized suspended particulates from a subsurface floor below a body of water as in claim 40 further comprising the steps of:

providing sequential stages for treatment of the water prior to disposal, including a first flow stage for flow equalization and for presettling out particles with high specific gravity, and a second stage including at least one filtration system removing very fine colloidal-sized particles remaining in the water after said stage one treatment;

providing a tertiary treatment process for removing residual soluble contaminants, if necessary;

continuing to treat water in said control zone and maintaining a negative pressure gradient to reduce suspended solids in the water column to extremely low levels and permitting the solids to settle for an extended period of time until dredging of said control zone is complete.

42. The method for removing micron-sized and sub-micron sized suspended particulates from a subsurface floor below a body of water as in claim 40 further comprising the steps of:

vacuum dredging the subsurface floor of said control zone and directing said hydraulically dredged solids to said at least one treatment vessel;

monitoring water column and sediment bottom quality;

withdrawing said drape and said sheet piles from subsurface floor;

relocating said vessel to a next area to be dredged; and, processing contaminated solids to a holding tank for stabilization storage, handling, and transport to a final disposal site.

43. A self-contained mobile marine system for extraction of contaminated sediments and dredge materials from the bottom of a water body comprising:

at least one floating marine vessel, said at least one floating marine vessel having suspendable therefrom at least one continuous mobile/submersible vertical barrier wall defining at least one predetermined confined dredge control zone continuously containing water of the water body on respective outer and inner sides of said vertical barrier wall, said confined dredge control zone containing liquid and suspended particles dispersed in a sediment excavation process from a predetermined bottom sediment surface area below said at least one floating marine vessel, said at least one floating marine vessel continuously floating during said sediment excavation process, wherein said at least one mobile/submersible vertical barrier wall defining at least one predetermined confined dredge control zone comprises at least one predetermined collection perimeter of a plurality of adjacent aligned sheet piles attached to an inner hull of said at least one floating marine vessel, said sheet piles being lowerable and driven into the area of bottom sediments, said at least one collection of said sheet piles defining a perimeter area encompassing a predetermined volume of said at least one control zone, said adjacent aligned sheet piles each having respective integral sockets joining a respective socket of each adjacent sheet pile.

* * * * *